Patented Apr. 15, 1947

2,419,090

UNITED STATES PATENT OFFICE 2,419,090

SILVER NITRATE ACTIVATOR FOR BUTADIENE-1,3 EMULSION POLYMERIZATION

Leo W. Rainard, Wayland, Mass., assignor to General Latex and Chemical Corporation, Cambridge, Mass., a corporation of Massachusetts No Drawing. Application May 11, 1944, Serial No. 535,201

1 Claim. (Cl. 260—86.5)

This invention relates to the emulsion polymerization of polymerizable unsaturated compounds and its object is to provide a more efficient and reliable process of polymerizing such compounds so as to obtain high yields of a polymer having desirable physical and chemical characteristics.

It is known that in the emulsion polymerization of compounds or mixtures of compounds of the aforementioned type, both the rate and character of the reaction may be varied profoundly by the agency of catalysts, such as peroxides and other compounds containing active oxygen in the molecule, finely divided metallic oxides, and salts of heavy metals exhibiting more than one valence, such as manganese, cobalt, nickel, lead, chromium, etc. It is also known that modifying agents, such as carbon tetrachloride, hexachloroethane and other organic halogen compounds, sodium cyanide, alkyl mercaptans, certain disulfides, sulfinic acids and dioxane, possess a directing effect on the course of the polymerization, both favoring the formation of linear polymers and determining the degree of polymerization.

I have found that the emulsion polymerization of unsaturated compounds such, for example, as the polymerizable conjugated dienes, substituted and unsubstituted, and the polymerizable alpha-substituted mono-olefins proceeds more reliably and efficiently and results in substantially higher yields of a polymer of desired quality when carried out in the presence of a polymerization catalyst, and a catalyst activator comprising an ionizable silver compound; and that the polymerization may be satisfactorily carried out in the presence of an emulsifying agent which produces stable emulsions in acid or alkaline solution.

In accordance with the present invention one or more polymerizable unsaturated compounds such, for example, as butadiene-1,3 or a mixture of butadiene-1,3 and one or more interpolymerizable compounds such as styrene, acrylonitrile and acrylic acid derivities, ethylene dicarboxylic acids, etc., is emulsified in an aqueous medium, using either an alkaline emulsifying agent such as sodium oleate, a rosin soap, a cotton seed oil soap or the like, a neutral emulsifying agent such as an ethylene glycol ester, or an acid emulsifying agent such as dodecylamine hydrochloride, thereby to produce a relatively stable emulsion in which the monomer or a mixture of monomers may constitute from 15 to 75% of the emulsion. When using a polymerizable mixture the ratio of the monomers may vary throughout a wide range, although the diene preferably constitutes at least 50% of the mixture.

Either before or after emulsifying I add a polymerization catalyst such, for example, as hydrogen peroxide, a persulfate, perborate, an organic peroxide, a compound containing active oxygen in the molecule, or a compound capable of slowly generating free radicals in an aqueous solution under conditions normally employed in emulsion polymerizations, together with a catalyst activator comprising an ionizable silver compound. The polymerization catalyst may be present in amounts varying from 0.01% to 2% or more, but the silver compound should be present in an amount not exceeding 1%, practical working limits being from 0.002% to 0.15%, depending upon the type and amount of catalyst to be used. Although, as above noted, any ionizable silver compound may be used, practical considerations indicate the use of the nitrate which is commercially available and readily soluble in water. However, reagents which suppress the ionization of silver compounds or form unionizable derivatives of silver tend to reduce the activating efficiency of the silver compound.

After having prepared the emulsion as above described a suitable stabilizer and a polymerization regulator may, if desired, be incorporated in accordance with the usual practice. In carrying out the polymerization any of the well known types of apparatus may be used and the time-temperature-pressure factors may be varied throughout a wide range, depending upon the yield and type of polymer desired. The resulting polymer is a latex which, if desired, may be used per se in accordance with well known procedures, or it may be coagulated and used in solid form.

The following table sets forth examples which illustrate the foregoing and provide a direct comparison between the results of my process and typical procedures employed in the production of Buna-S:

|  | Example I | Example II | Example III |
|---|---|---|---|
| Butadiene-1,3 _____grams__ | 75 | 75 | 75 |
| Styrene _____do____ | 25 | 25 | 25 |
| Water _____do____ | 180 | 180 | 180 |
| Sodium Oleate _____do____ | 3 | 3 | 3 |
| D. D. Mercaptan [1] _____do____ | 0.2 | 0.2 | 0.2 |
| Potassium Persulfate _____do____ | 0.3 | 0.3 | 0.3 |
| Silver Nitrate _____do____ | None | 0.05 | None |
| Potassium Ferricyanide _____do____ | None | None | 0.015 |
| pH (initial) _____ | 10.3 | 10.1 | 10.3 |
| Yield (40° C./15 hrs.) _____per cent__ | 22 | 43 | 36.8 |

[1] An alkaline dispersing agent consisting of a long chain aliphatic mercaptan.

The yields obtained in Example II and III are respectively functions of silver nitrate concentration and ferricyanide concentration, and the yields obtained as either of the reagents are increased pass through a maximum. The values selected are those for optimum concentrations of silver nitrate and potassium ferricyanide in the system illustrated.

It will be observed that the presence of the silver salt in Example II increases the yield almost 100% as compared with the yield of Example I, in which the polymerization was carried out in the presence of an oxygen-containing catalyst alone, and approximately 17% as compared with Example III, in which a known activator for the catalyst was used.

Further examples illustrative of my process are set forth in the following table:

|  | Example IV | Example V | Example VI |
|---|---|---|---|
| Butadiene-1,3 _____ grams | 75 | 75 | 100 |
| Styrene _____ do | 25 | 25 | None |
| Water _____ do | 100 | 100 | 100 |
| Soap _____ do | None | None | 3 |
| Triton K-60 [1] _____ do | 3 | 3 | None |
| Potassium Persulfate _____ do | None | None | 0.1 |
| Hydrogen Peroxide _____ do | 0.2 | 0.2 | None |
| Silver Nitrate _____ do | None | 0.01 | 0.05 |
| pH (initial) _____ | 3.8 | 3.8 | 11.1 |
| Yield (60° C./18 hrs.) _____ per cent | 30 | 100 | 80 |

[1] An acid emulsifying agent consisting of an alkylated ammonium chloride.

It will be noted from the foregoing table that a 100% yield is obtained with an acid emulsion (Example V) using only 0.2% hydrogen peroxide and 0.01% silver nitrate, based on the weight of the monomers; and that with an alkaline emulsion (Example VI) using only 0.1% potassium persulfate and 0.05% silver nitrate, a yield of 80% was obtained.

I claim:

In the manufacture of emulsion polymers, the process which comprises polymerizing an aqueous emulsion comprising a mixture of a major proportion of butadiene-1,3 and a minor proportion of styrene in the presence of 0.01% to 2% of a peroxy compound catalyst and from 0.002% to 0.15% of an activator consisting of silver nitrate.

LEO W. RAINARD.

REFERENCES CITED

The following references are of record in the file of this patent:

UNITED STATES PATENTS

| Number | Name | Date |
|---|---|---|
| 1,935,733 | Tschunkur | Nov. 21, 1933 |
| 1,938,730 | Tschunkur | Dec. 12, 1933 |